(12) United States Patent
Juzswik (10) Patent No.: US 6,801,134 B1
(45) Date of Patent: Oct. 5, 2004

(54) SYSTEM AND METHOD FOR AUTOMATIC FUNCTION OPERATION WITH CONTROLLED DISTANCE COMMUNICATION HAVING VEHICLE-BASED FREQUENCY SELECTION

(75) Inventor: David Leonard Juzswik, Commerce, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/517,829

(22) Filed: Mar. 2, 2000

(51) Int. Cl.[7] .............................................. G08C 19/00
(52) U.S. Cl. ............................ 340/825.69; 340/825.72; 340/5.2; 340/5.61; 340/5.66; 340/5.64; 340/5.72; 340/5.7; 340/426.1; 307/10.2
(58) Field of Search ........................ 340/825.69, 825.72, 340/5.2, 5.61, 5.64, 5.72, 5.66, 5.7, 426; 307/10.2; 455/63, 336; 375/222

(56) References Cited

U.S. PATENT DOCUMENTS

| | | | |
|---|---|---|---|
| 4,616,364 A | 10/1986 | Lee | |
| 4,644,347 A | 2/1987 | Lucas et al. | |
| 4,688,036 A | 8/1987 | Hirano et al. | |
| 4,794,268 A | 12/1988 | Nakano et al. | |
| 4,811,013 A | 3/1989 | Akutsu | |
| 5,142,691 A | 8/1992 | Freeburg et al. | |
| 5,303,259 A | 4/1994 | Loveall | |
| 5,319,364 A | 6/1994 | Waraksa et al. | |
| 5,379,033 A | 1/1995 | Fujii et al. | |
| 5,428,818 A | 6/1995 | Meidan et al. | |
| 5,438,699 A | 8/1995 | Coveley | |
| 5,499,388 A | 3/1996 | Song | |
| 5,682,135 A | 10/1997 | Labonde | |
| 5,933,074 A | * 8/1999 | Settles et al. | ................ 340/426 |
| 6,323,566 B1 | * 11/2001 | Meier | ........................ 307/10.2 |
| 6,389,275 B1 | * 5/2002 | Kawashima et al. | ......... 455/336 |
| 6,603,388 B1 | * 8/2003 | Perraud et al. | ............. 340/5.61 |

OTHER PUBLICATIONS

U.S. LeMense et al. patent application Ser. No. 09/055,751, filed Apr. 6, 1998 entitled "Apparatus and Method for Remote Convenience Message Reception and Control Utilizing Frequency Diversity."
U.S. LeMense et al. patent application Ser. No. 09/055,830, filed Apr. 6, 1998 entitled "Apparatus and Method for Remote Convenience Message Transmission and Control Utilizing Frequency Diversity."
U.S. Steiner patent application Ser. No. 09/300,415, filed Apr. 27, 1999 entitled "System and Method for Automatic Vehicle Unlock Initiated Via Beam Interruption."

* cited by examiner

Primary Examiner—Ario Etienne
Assistant Examiner—Yves Dalencourt
(74) Attorney, Agent, or Firm—Tarolli, Sundheim, Covell & Tummino L.L.P.

(57) ABSTRACT

A system (10) for remotely controlling a function includes a portable transceiver (34) that outputs a request signal (30) at one of a plurality of frequencies. A base unit (24) receives the request signal (30) and performs the requested function in response to the receipt. The base unit (24) includes components (e.g., 66, 70 and 74) that select the one frequency at which the portable transceiver (34) outputs the function request signal (30) and that provide the selected frequency to the portable transceiver.

21 Claims, 8 Drawing Sheets

SYSTEM AND METHOD FOR AUTOMATIC FUNCTION OPERATION WITH CONTROLLED DISTANCE COMMUNICATION HAVING VEHICLE-BASED FREQUENCY SELECTION

FIELD OF THE INVENTION

The present invention relates to passive function systems, such as passive entry systems, and specifically relates to a system that permits operation of a vehicle function, such as entry into a vehicle, when an authorized person is within a predefined range. Preferably, the authorized person is identified via communication that avoids communication interference and does not consume an undue amount of power.

BACKGROUND OF THE INVENTION

Passive function systems are known. One particular example type of passive function systems is passive entry systems. Such systems permit automatic unlocking/opening of a secured entranceway for an authorized person wishing to gain entrance. Passive entry systems relieve the authorized person of the burden of manually turning a key in a lock, manually actuating a hand-held transmitter, manually inputting a code into a touch pad, or the like. One example type of such a passive entry system is for a vehicle that permits the authorized person to gain entrance through a vehicle door, or the like, into a secured portion of the vehicle such as an interior or a trunk area of the vehicle.

A passive system includes an identification transceiver carried on an authorized person and a base transceiver located in association with the secured entranceway. The base transceiver interrogates the identification transceiver, and in response to the interrogation, the identification transceiver outputs a signal that conveys an appropriate security code identification. In response to reception of the signal conveying the security code identification, the base transceiver outputs a function operation signal. Such systems are often referred to as radio frequency identification systems or contact-less identification and authentication systems.

In the case of a passive entry system, the output of the signal from the base received results in unlocking/opening of the secured entranceway. Thus, the authorized person may simply operate (e.g., lift/pull a door handle) the secured entranceway and/or pass through the secured entranceway.

Within a passive entry system, it is typically desirable to have the authorized person in close proximity to the secured entranceway when access through the secured entranceway is permitted. For example, for a passive vehicle entry system, the authorized person should be relatively near to the associated vehicle before a vehicle door is unlocked. Having the authorized person in close proximity to the vehicle upon unlocking of the vehicle door will help alleviate a possibility that an authorized person would be unaware that a vehicle door was passively unlocked.

For certain types of passive function systems, an interrogation sequence between a base transceiver and an identification transceiver results in power consumption at each transceiver. Often, identification transceivers are relatively small and have relatively small power supplies. For example, within passive vehicle entry systems, the power supply associated with the identification transceiver is a battery that is approximately the size of a small coin. The life of the battery is directly proportional to the amount of energy that the identification transceiver expends in outputting its response signal.

The person of ordinary skill in the art will appreciate that the communication exchange that occurs between a base transceiver and a portable transceiver must comply with regulations concerning frequency and maximum transmitted signal strength. In the United States, such regulations are imposed by the Federal Communications Commission ("FCC") and are specifically directed to unlicensed transmission devices. In the United States, remote control communication for passive entry systems and the like typically occurs in the portion of the radio frequency ("RE") spectrum that is allocated by the FCC for unlicensed transmission devices. Typically, the communication exchange that occurs between a base transceiver and a portable transceiver is within the ultrahigh frequency ("UHF") portion of the RF spectrum. However, the person of ordinary skill in the art will appreciate that noise can be present in certain parts of the RF spectrum.

Interference (e.g., radio frequency interference) caused by the noise may adversely effect some communication systems. The amount of interference may rise to the level of communication disruption. It is possible that some types of passive entry systems may be adversely effected by interference. The result would be that the authorized person would not have the convenience of passive performance of the function. For example, the authorized person would not have the convenience of passive entry (e.g., the authorized person would have to turn a key in a lock, manually input a code into a touch pad, or the like).

SUMMARY OF THE INVENTION

In accordance with one aspect, the present invention provides a system for remotely controlling a function. Means outputs a function request signal at one of a plurality of frequencies. Means receives the function request signal and performs the requested function in response to receipt of the function request signal. Means, associated with the means for receiving the function request signal and for performing the requested function, selects the one frequency at which the means for outputting outputs the function request signal and provides the selected one frequency to the means for outputting.

In accordance with another aspect, the present invention provides a system for remotely controlling access through a securable entrance. Means outputs an access request signal at one of a plurality of frequencies. Means receives the access request signal and permits access through the entrance in response to receipt of the access request signal. Means, associated with the means for receiving the access request signal and for permitting access, selects the one frequency at which the means for outputting outputs the access request signal and provides the selected one frequency to the means for outputting.

In accordance with another aspect, the present invention provides a system for remotely controlling a function. Means outputs function request signals, each function request signal being at a different frequency. Means receives the function request signals. Means performs the requested function in response to receipt of at least one function request signal by the means for receiving. Means causes the means for outputting to continue to output the different frequency function request signals until the means for receiving receives the at least one function request signal.

In accordance with another aspect, the present invention provides a system for remotely controlling access through a securable entrance. Means outputs access request signals, each access request signal being at a different frequency.

Means receives the access request signals. Means permits access through the entrance in response to receipt of at least one access request signal by the means for receiving. Means causes the means for outputting to continue to output the different frequency access request signals until the means for receiving receives the at least one access request signal.

In accordance with another aspect, the present invention provides a system for remotely controlling access through a securable entrance. Control means permits access through the entrance in response to receipt of an access request command. Base transceiver means, associated with the control means, outputs and receives signals that comprise communication to achieve receipt of the access request command at the control means. Portable transceiver means outputs and receives signals of the communication that includes outputting a signal that conveys the access request command. At least one of the base transceiver means and the portable transceiver means includes means for changing frequency of signals output therefrom.

In accordance with yet another aspect, the present invention provides a system for remotely controlling access through a securable entrance. Control means permits access through the entrance in response to receipt of an access request command. Base transceiver means, associated with the control means outputs and receives signals that comprise communication to achieve receipt of the access request command at the control means. Portable transceiver means outputs and receives signals of the communication that includes outputting a signal that conveys the access request command. One of the base transceiver means and the portable transceiver means includes means for outputting signals via provision of magnetic fields. The other of the base transceiver means and the portable transceiver means includes means for outputting signals via radio frequency broadcasts.

In accordance with yet another aspect, the present invention provides a method for gaining access through a securable entrance. A frequency at which an access request signal is to be output from a requesting location is selected at a receiving location. The selected frequency is provided to the requesting location from the receiving location. The access request signal is output at the selected frequency from the requesting location. The access request signal is received at the receiving location. Access is permitted through the entrance in response to receipt of the access request signal.

In accordance with still another aspect, the present invention provides a method for gaining access through a securable entrance. Access request signals are output. Each access request signal is at a different frequency. At least one of the access request signals is received. Access through the entrance is permitted in response to the receipt of the one access request signal. The step of outputting access request signals at different frequencies continues until the one access request signal is received.

In accordance with still another aspect, the present invention provides a method for gaining access through a securable entrance. An interrogation signal is output to a requesting location from a door access control location. The interrogation signal is received at the requesting location. An access request signal is output to the door access control location from the requesting location. The access request signal is received at the receiving location. Access is permitted through the entrance in response to receipt of the access request signal. One of the interrogation signal and the access request signal is conveyed via a magnetic field and the other of the interrogation signal and the access request signal is conveyed via radio frequency broadcast.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF PREFERRED EMBODIMENTS

Figure 1:
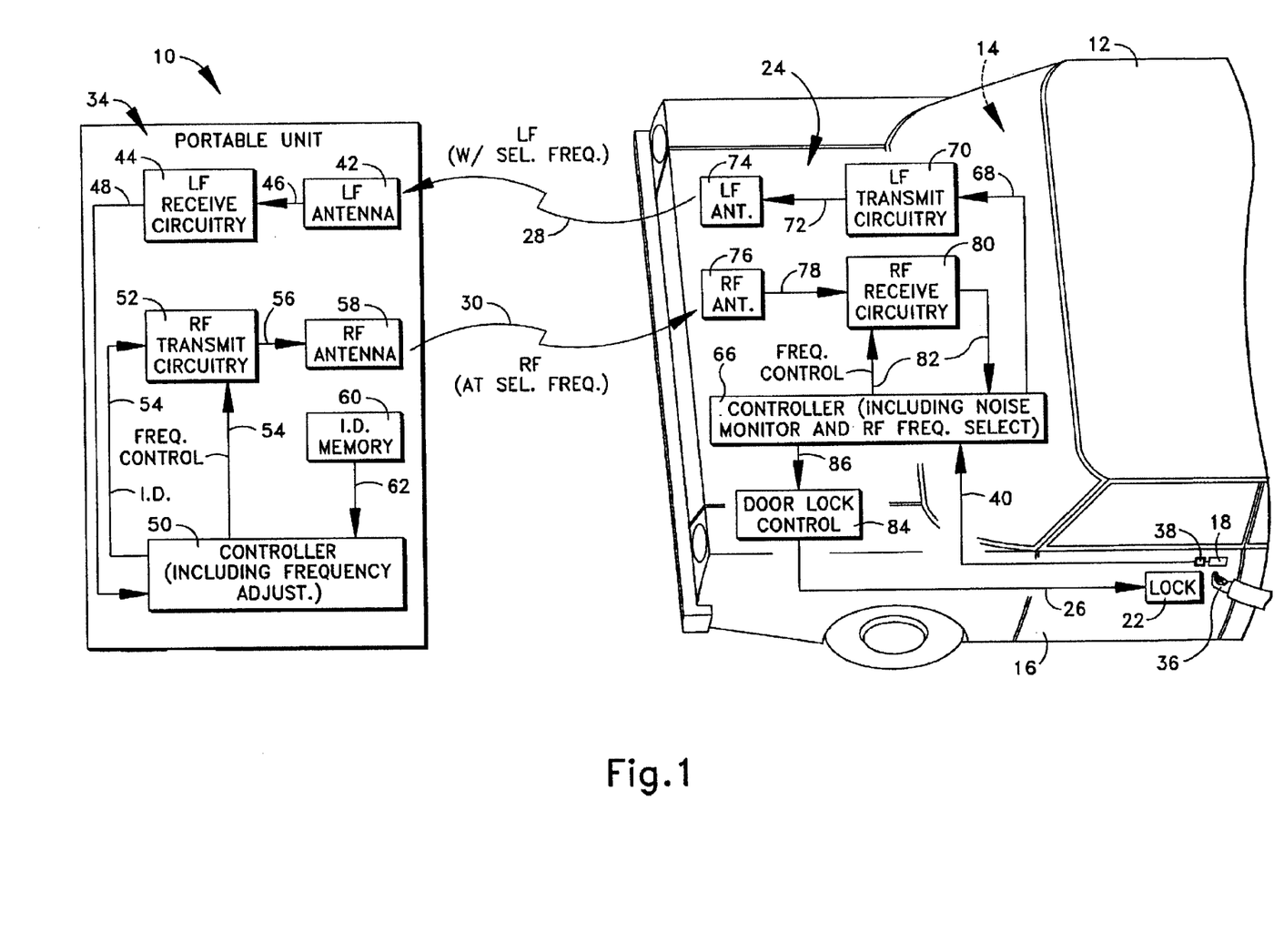
FIG. 1 is a block diagram of a first embodiment of a system in accordance with the present invention, and an associated vehicle.

A system 10, in accordance with the present invention, and an associated vehicle 12 are shown in FIG. 1. The vehicle 12 includes an interior 14 that is enclosed by at least one access door 16. The door 16 is movable and has a handle 18 that is manually actuatable to cause actuation of a latch mechanism (not shown). Latch mechanism actuation releases the door to open such that entrance may be gained into the interior 14 of the vehicle 12. In broad terms, the door 16 is a securable entrance cover that closes an entranceway into the vehicle interior 14 and the vehicle interior is a secured area. A lock mechanism 22 maintains the latch mechanism in a latched condition and prevents opening of the door 16. The person of ordinary skill in the art will appreciate that any of numerous types and configurations of latch mechanisms and lock mechanisms can be used.

The system 10 includes an automatic-unlock transceiver/control unit 24 located at the vehicle 12.

Hereinafter, the automatic-unlock transceiver/control unit 24 is referred to as the vehicle-based unit 24. It is to be appreciated that the vehicle-based unit 24 is shown in a disproportionate size in FIG. 1 with regard to the vehicle 12 for illustration purposes. The vehicle-based unit 24 is operatively connected 26 to the lock mechanism 22 and controls operation of the lock mechanism. The vehicle-based unit 24 emits an interrogation signal 28 and also receives a response signal 30.

An identification transceiver 34 is located on an authorized person (only a hand 36 of the authorized person is shown by the door handle 18). The identification transceiver 34 may take the form of a button, a tag, or a fob that the authorized person carries in their pocket, in their purse, or secured to their key chain. Thus, the identification transceiver 34 is a portable transceiver that is carried by the authorized person. Hereinafter, the identification transceiver 34 is referred to as the portable transceiver 34. It is to be appreciated that the portable transceiver 34 is not illustrated in FIG. 1 as being to scale with the vehicle 12, the hand 36 of the authorized person, etc. for illustrative purposes.

The portable transceiver 34 receives the interrogation signal 28 from the vehicle-based unit 24. In response to reception of the interrogation signal 28, the portable transceiver 34 emits the response signal 30 as a request (e.g., entry command) for the authorized person to gain access into the interior 14 of the vehicle 12. The response signal 30 conveys an appropriate security code, which identifies the portable transceiver 34 and thus identifies the bearer of the portable transceiver as the person that is authorized to enter the vehicle 12.

In response to reception of the response signal 30, the vehicle-based unit 24 provides a signal to the lock mechanism 22 that causes actuation of the lock mechanism to an unlock condition. Thus, the authorized person can gain entry into the interior 14 of the vehicle 12 without manually operating any unlock device. Specifically, the authorized person does not need to manually turn a key, manually operate a hand-held transmitter, or manually enter a code on a touch pad at the vehicle 12, or the like. In broad terms, the vehicle-based unit 24 and the portable transceiver 34 are in a communication arrangement for performing the interrogation and automatic unlock sequence for the authorized person. Further, in broad terms, the automatic unlocking is a passive function. In the illustrated example, the passive function is performed at a vehicle (i.e., vehicle 12) and is thus a passive vehicle function, with the function being unlocking of the door 16, the system 10 is a passive entry system.

In the illustrated example, the vehicle-based unit 24 does not continuously output interrogation signals. Such a continuous output of interrogation signals is associated with an unneeded consumption of vehicle power (i.e., a drain on a vehicle battery). Thus, the vehicle-based unit 24 utilizes an initiation stimulus that is indicative of the authorized person being in close proximity to the vehicle 12 and desiring entrance into the vehicle.

In the illustrated example, a sensor 38 is provided in conjunction with the door handle 18 and operatively connected 40 to the vehicle-based unit 24 such that when the hand 36 of the authorized person reaches to actuate the handle, the interrogation sequence is initiated (i.e., the vehicle-based unit 24 outputs the interrogation signal 28). One example of a system that initiates a passive entry interrogation when the authorized person reaches to actuate a vehicle door handle is disclosed in U.S. patent application Ser. No. 09/300,415, filed Apr. 27, 1999. The person of ordinary skill in the art will appreciate that other stimulus can be sensed to initiate the interrogation sequence. For example, the authorized person may actuate a pushbutton on the vehicle.

In accordance with one aspect of the present invention, the vehicle-based unit 24 selects a RF frequency at which the portable transceiver 34 is to provide the response signal 30. Selection of RF frequency permits avoidance of noisy frequency channels.

In accordance with another aspect of the present invention, the vehicle-based unit 24 provides the information regarding the selected RF frequency to the portable transceiver 34 as part of the interrogation signal 28 that is a low frequency (LF) magnetic field signal (e.g., 125 kHz). Use of a magnetic field signal permits a more controlled range of interrogation interaction. Specifically, the magnetic field signal strength is related to the inverse of the cube of the distance, whereas RF signal strength is related to the inverse of the square of the distance. Thus, a magnetic interrogation signal is less likely to reflect and propagate over a great distance and reach a portable transceiver located a relatively great distance from a vehicle. Also, the magnetic field is somewhat impervious to interference.

In accordance with still another aspect of the present invention, different response signal frequencies (i.e., the RF frequency at which the identification transceiver responds to the vehicle-based unit) are selectable and/or different interrogation signal frequencies (i.e., the LF frequency at which the vehicle-based unit 24 provides the selected RF frequency information to the portable transceiver 34) are selectable. Also, in accordance with another aspect of the present invention, the response signals from the portable response transceiver 34 are RF signals, as opposed to LF signals like the LF interrogation signals, to prevent undue power consumption at the portable transceiver.

Turning to details of the first example embodiment shown in FIG. 1, the portable transceiver 34 includes a magnetic field antenna 42 for receiving the LF magnetic field signal 28. LF receive circuitry 44 is operatively connected 46 to the LF antenna 42 and is also operatively connected 48 to a controller 50. The LF receive circuitry 44 conveys the information contained within the LF interrogation signal 28 to the controller 50. Specifically, the information contained within the LF signal 28 includes a request or stimulus (e.g., a wake-up) for the portable transceiver 34 to output its identification (i.e., security code) via the RF response signal 30. The information provided via the LF signal 28 also contains data that conveys the RF frequency at which the portable transceiver 34 is to output the RF response signal 30.

Tunable RF transmit circuitry 52 is operatively connected 54 to the controller 50 and is also operatively connected 56 to a RF antenna 58. The controller 50 provides a frequency control signal to the RF transmit circuitry 52 that represents the selected RF frequency provided to the portable transceiver 34 via the LF signal 28. The frequency control signal is utilized within the RF transmit circuitry 52 to adjust or tune the frequency at which the RF response signal 30 occurs. Tunable RF transmit circuitry is known in the art and is not discussed herein in detail. One example of a device that has a tunable or adjustable frequency output is disclosed within U.S. patent application Ser. No. 09/055,830, filed Apr. 6, 1998.

The security code identification of the portable transceiver 34 is retrieved by the controller 50 from an identification memory 60 that is operatively connected 62 to the controller. The controller 50 provides a message packet to the RF transmit circuitry 52 that contains the security code identification of the portable transceiver 34. An electrical stimulus signal that conveys the security code identification is output from the RF transmit circuitry 52. The stimulus signal causes the RF antenna 58 to output (e.g., broadcast) the RF response signal 30 conveying the security code identification at the selected RF frequency.

At the vehicle-based unit 24, the connection 40 from the sensor 38 at the door handle 18 extends to a controller 66. Thus, the controller 66 receives the signal from sensor 38 that is indicative of the hand 36 reaching to actuate the door handle 18. When the signal is received from the door handle sensor 38, the controller 66 makes a selection regarding the RF frequency that the portable transceiver 34 is to use for the RF response signal 30 and begins the interrogation process. The selection of the RF frequency may be done via several techniques and is discussed below.

The controller 66 is operatively connected 68 to LF transmit circuitry 70 and, in turn, the LF transmit circuitry is operatively connected 72 to a LF antenna 74. The controller 66 provides a message package to the LF transmit circuitry 70 that contains the interrogation initiation request and data that conveys the selected RF frequency at which the portable transceiver 34 is to respond. An electrical stimulus signal from the LF transmit circuitry 70 to the LF antenna 74 conveys the message information and stimulates the LF antenna 74 to output (e.g., broadcast) the LF signal 28.

A RF antenna 76 of the vehicle-based unit 24 is operatively connected 78 to RF receive circuitry 80, which is in turn operatively connected 82 to the controller 66. The RF receive circuitry 80 is tunable or adjustable. The controller 66 provides a frequency control signal to the RF receive circuitry 80 such that the RF receive circuitry is tuned or adjusted. In pertinent part, the RF receive circuitry 80 is tuned to the RF frequency at which the controller 66 has selected for the portable transceiver 34 to respond.

In response to the RF antenna 76 receiving the response RF response signal 30 at the selected frequency, an electrical signal is provided to the RF receive circuitry 80. In turn, the RF receive circuitry 80 conveys the message packet that contains the security code identification of the portable transceiver 34 to the controller 66. The controller 66 processes the provided security code identification.

A door lock control 84 is operatively connected 86 to the controller 66. The connection 26 to the lock mechanism 22 extends from the door lock control 84. If the security code is verified, the controller 66 provides an appropriate signal to the door lock control 84, which in turn actuates the lock mechanism 22 to an unlocked condition.

Turning to selection of the RF frequency for the RF response signal 30 from the portable transceiver 34, the controller 66 of the vehicle-based unit 24 of the embodiment shown in FIG. 1 makes a selection based upon determinations of which of several possible frequency channels would likely result in receipt of the response signal 30 or at least have the best chance of causing the receipt of the response signal. In other words, the controller 66 selects a RF frequency based upon an acceptable or highest likelihood that the RF response signal 30 at the selected frequency from the portable transceiver 34 will reach the vehicle-based unit 24. Any of several techniques and/or determinations can be utilized by the controller 66 to conclude that selection of a particular frequency should result in reception of the RF response signal 30 at the vehicle-based unit 24.

Figure 2:
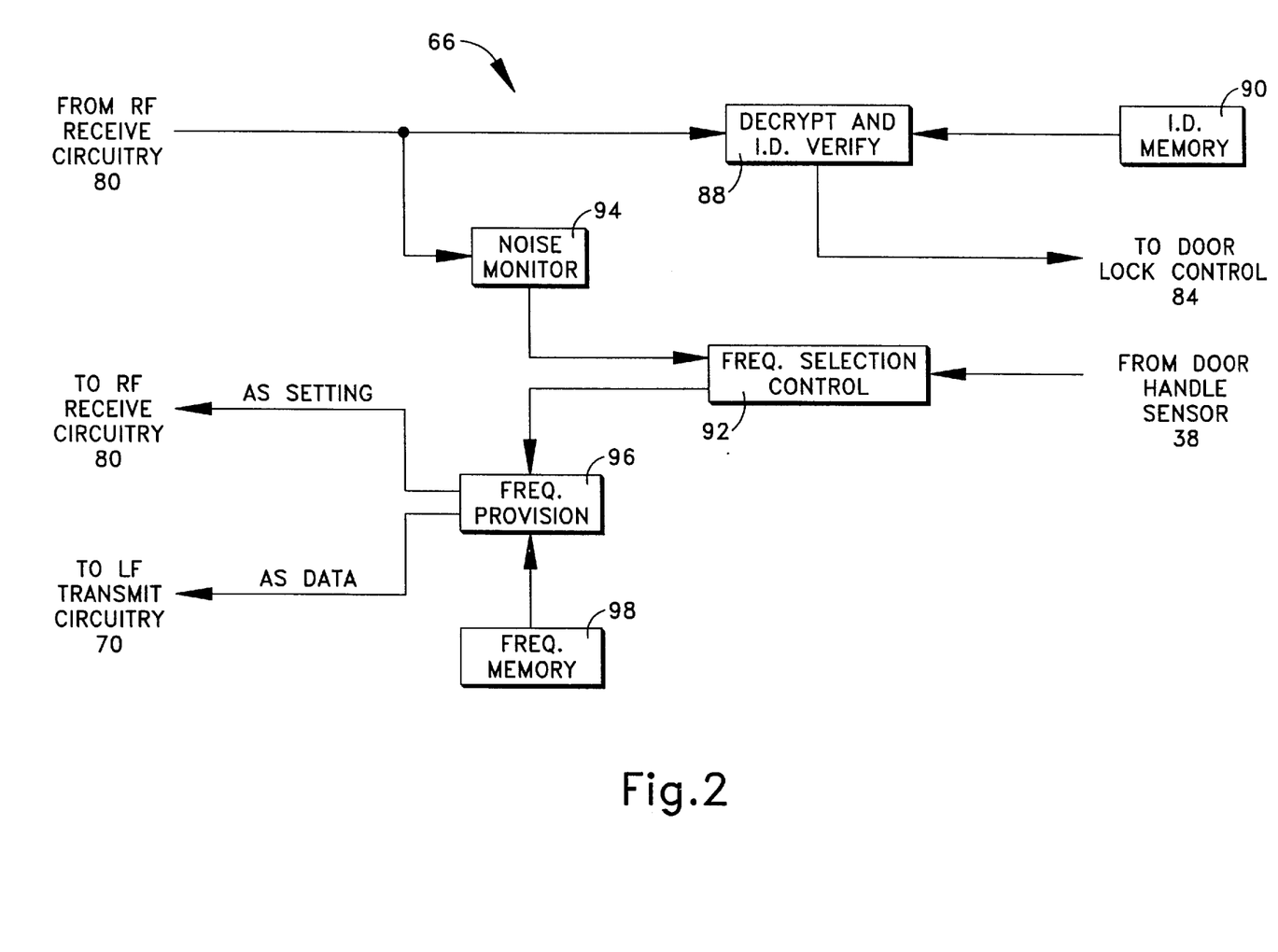
FIG. 2 is a function block diagram of a controller at the vehicle shown in FIG. 1.

Specifically, turning to FIG. 2, a function block diagram of an example of the controller 66 of the embodiment of FIG. 1 is shown. For processing the information conveyed via the RF response signal 30, the controller 66 includes a decrypt/identification verification function portion 88 that receives the signal output from the RF receive circuitry that conveys the message (i.e., the security code identification) of the response signal. The message is decrypted using one or more decryption keys to provide the received message in a non-encrypted form. The security code identification provided within the received message is then compared to a security code retrieved from an identification memory 90. If the security codes match (i.e., the received message is authentic), the decrypt/identification verification function portion 88 outputs the signal to the door lock control 84 to cause unlocking of the vehicle door 16.

Turning to the selection of a RF frequency in the example of FIG. 2, the controller 66 includes a frequency selection control function portion 92. Different noise levels can occur at different frequencies. A noise monitor function portion 94 receives the output from the RF receive circuitry 80 and provides an input signal to the frequency selection control function portion 92. The signal from the noise monitor function portion 94 has a signal characteristic that is indicative of the noise that is currently being received at the RF antenna 76 and conveyed to the RF receive circuitry 80. In one embodiment, the signal from the noise monitor function portion 94 is a voltage that is proportional to the received signal noise.

The received signal noise will be associated with the frequency that the RF receive circuitry 80 is currently tuned to receive. In the example of FIG. 2, different predetermined frequencies (i.e., channels) are monitored to determine the associated noise levels. The frequency selection control function portion 92 selects a frequency channel that has noise below a predetermined threshold level. If none of the predetermined frequency channels has a noise level below the threshold level, the frequency selection control function portion 92 make a selection based upon the least amount of noise. Preferably, noise on the various potential frequency channels is monitored and selection of a RF frequency channel occur just prior to the system 10 engaging in the exchange of signals for the interrogation process that determines whether to permit entrance into the vehicle 12.

In order to tune the RF receive circuitry 80 to the various frequencies (i.e., channels), a frequency provision function portion 96 and a frequency memory 98 are provided within the controller 66. The frequency memory 98 contains stored information regarding the predefined frequencies or channels. The information stored in the memory 98 is utilized by the frequency provision function portion 96 to tune (e.g., program) the RF receive circuitry 80 to one of the predetermined frequencies.

Tuning (e.g., programming the RF receive circuitry 80) to a specific RF frequency allows the noise at the specific frequency to be monitored. The frequency selection control function portion 92 commands the frequency provision function portion 96 to sequence through the predetermined frequency channels while noise is monitored. The frequency selection control function portion 92 receives the triggering signal from the door handle sensor 38 and in response to receipt of the triggering signal initiates the procedure with regard to sequencing through the predetermined frequencies and the selection of the RF frequency. As the RF receive circuitry 80 is sequentially tuned to each frequency, the noise at each frequency is monitored.

Also, as mentioned above, tuning the RF receive circuitry 80 to the selected frequency for the interrogation sequence allows the RF response signal 30 at the selected frequency to be received. Tuning the RF receive circuitry 80 to the selected frequency occurs, naturally, after the frequency is selected and contemporaneously with the frequency provision function means providing the selected RF frequency to the LF transmit circuitry 70 in the form of a data string (e.g., a message package).

Turning to operation, when the door handle sensor 38 senses the hand 36 reaching for the handle, the triggering signal from the door handle sensor is provided to the frequency selection control function portion 92. In turn, the frequency provision function portion 96 is commanded to sequentially tune the RF receive circuitry 80 while the frequency selection control function portion 92 monitors the noise. The first frequency channel that has a noise below the certain threshold level is selected. If, after the RF receive circuitry 80 has been sequential tuned to all of the predetermined frequency channels, none of the frequency channels had noise below the certain threshold, then the frequency channel with the least noise is selected. Once the frequency selection control function portion 92 selects a frequency for use in RF communication, a signal is provided to the frequency provision function portion 96 that causes the selected frequency to be provided to the RF receive circuitry 80 as the setting and to the LF transmit circuitry 70 as the data.

Figure 3:
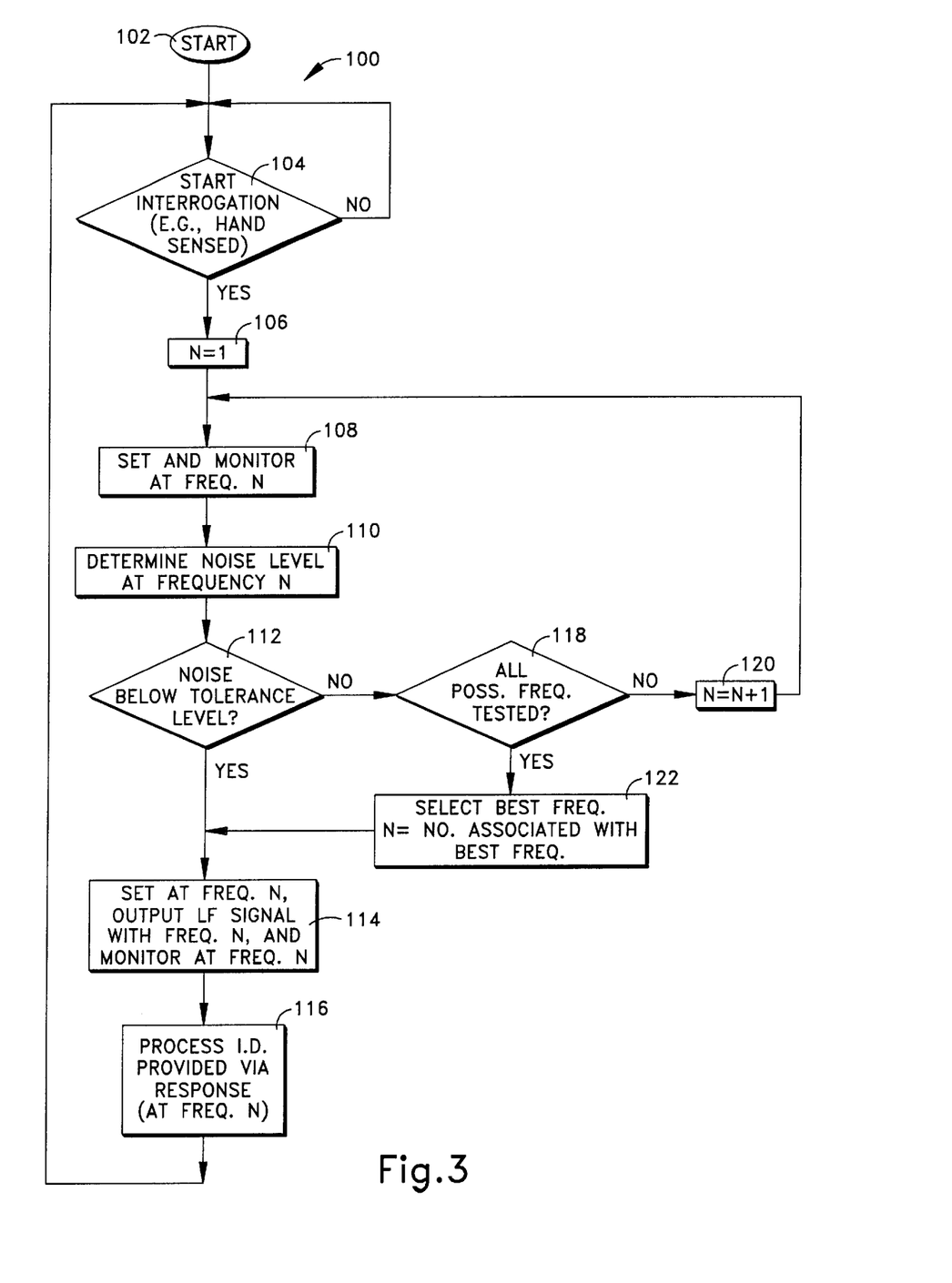
FIG. 3 is a flow chart for a process performed within the controller at the vehicle of FIG. 1.

An example of a process 100 that is performed within the controller 24 is shown in FIG. 3. The process 100 is initiated at step 102 and proceeds to step 104. At step 104, it is determined whether the interrogation procedure is to be initiated. In the specific example, step 104 determines if the signal provided from the door handle sensor 38 indicates the hand 36 reaching for the door handle. If the determination at step 104 is negative (i.e., the door handle sensor 38 has not yet indicated a hand reaching for the handle), the process 100 loops back to repeat step 104.

If the determination at step 104 is affirmative (i.e., the hand 36 is reaching for the door handle), the process 100 proceeds to step 106. At step 106, the variable N is set equal to one. The variable N represents the channel number (i.e., predetermined frequency) to be used for RF communication. At step 108, the RF receive circuitry is set to receive the frequency N and the noise at frequency N is monitored. At step 110, the noise level associated with frequency N is determined. At step 112, it is determined whether the noise at frequency N is below a predetermined tolerance level.

If the determination at step 112 is affirmative (i.e., the noise is sufficiently LOW at frequency N), the process 100 proceeds to step 114. At step 114, the frequency N is the selected frequency. Thus, the RF receive circuitry 80 is tuned to the selected frequency N and the frequency N is output to the LF transmit circuitry 70 as data. At step 116, information that is received via the RF response signal 30 at the selected frequency N is processed such that the provided identification is verified. If the message is authentic (i.e., security code is verified), the door 16 is unlocked. Upon completion of step 116, the process 100 loops back to step 114 to again monitor for an initiation of an interrogation sequence.

Turning again to step 112, if the noise level for the selected frequency N is not below the predetermined tolerance level, the process 100 proceeds from step 112 to step 118. At step 118, it is determined whether all of the potential predetermined frequency channels have been tested. If the determination at step 118 is negative (i.e., all of the frequency channels have not yet been tested), the process 100 proceeds from step 118 to step 120. At step 120, the variable N is increased by 1. Thus, the value N is increased such that the next frequency channel is utilized in the noise determination process. Upon completion of step 120, the process 100 proceeds to step 108 where the RF receive circuitry is tuned to the new frequency N.

If the determination at step 118 is affirmative (i.e., all of the predetermined frequencies have been tested), the process 100 proceeds from step 118 to step 122. At step 122, the frequency selection control function portion 92 makes a determination as to which of the frequencies had the least noise (despite the fact that each frequency had a level of noise above the tolerance level). Within step 122, the variable N is assigned the number that is associated with the frequency that had the least noise. The process 100 proceeds from step 122 to step 114. At step 114, the RF receive circuitry 80 is tuned to the selected frequency and the selected frequency is output as data to the LF transmit circuitry 70. The process 100 continues with step 116 as previously described.

Figure 4:
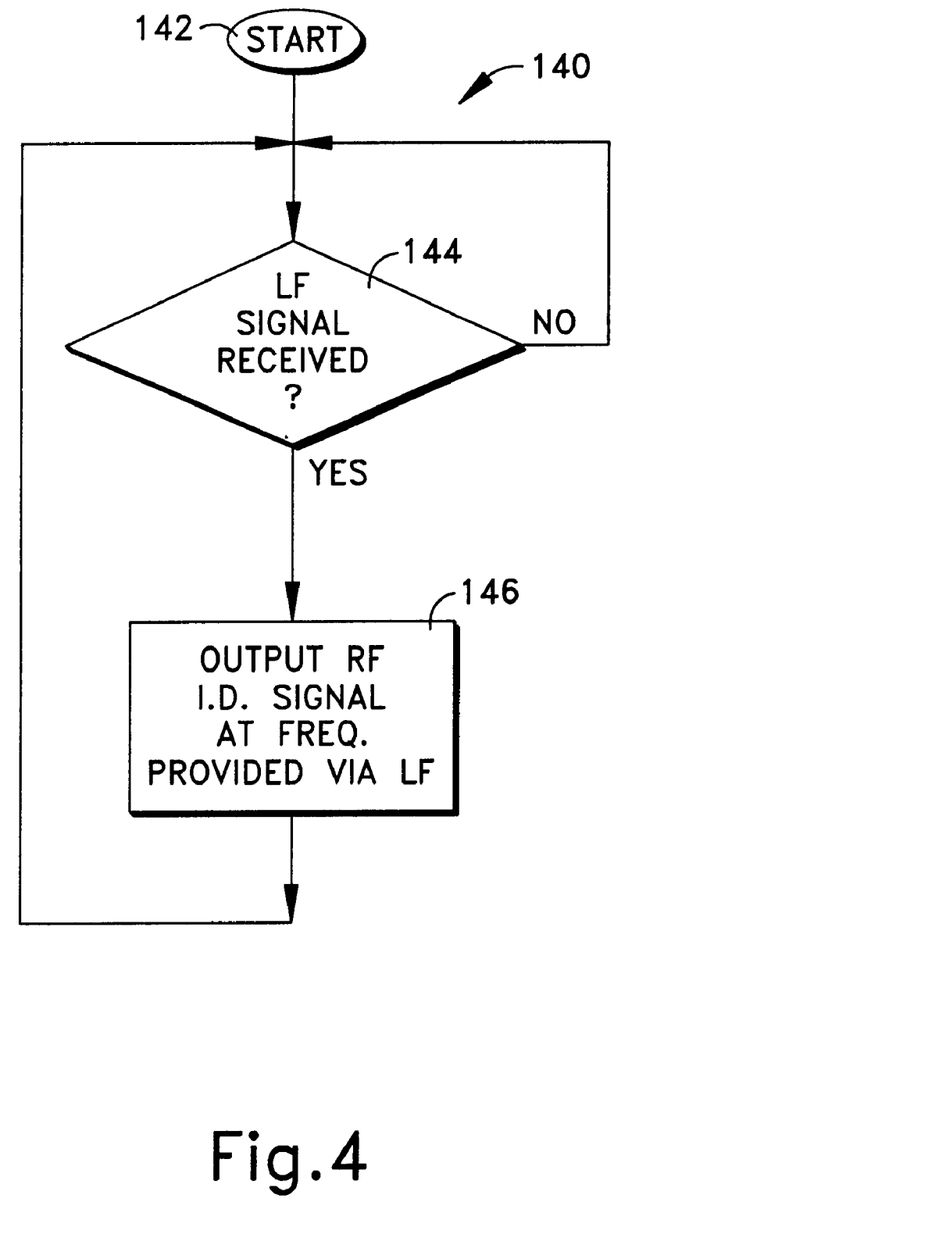
FIG. 4 is a process formed within a controller at a portable transceiver shown in FIG. 1.

Turning to FIG. 4, an associated process 140 that occurs within the portable transceiver 34 is shown. The process 140 is initiated at step 142 and proceeds to step 144. At step 144, it is determined if the LF signal is received. If the determination at step 144 is negative (i.e., the LF signal is not yet receive), the process 140 loops to repeat the step 144. If the determination at step 144 is affirmative (i.e., the LF signal is received), the RF response signal 30 is output to convey the security code identification at the RF frequency that is provided via the data contained within the LF signal 28. Upon completion of step 146, the process 140 loops back to step 144.

In accordance with another aspect of the present invention, the selection of a RF frequency at a vehicle-based unit need not include a determination regarding which predetermined frequency is a suitable frequency or a determination of which of the predetermined frequencies has the least noise. As an example of this aspect of the present invention, a vehicle-based unit sequentially selects RF frequencies that are provided to a portable transceiver for RF response signals from the portable transceiver. The vehicle-based unit continues to select frequencies until a RF response signal from the portable transceiver reaches the vehicle-based unit.

Figure 5:
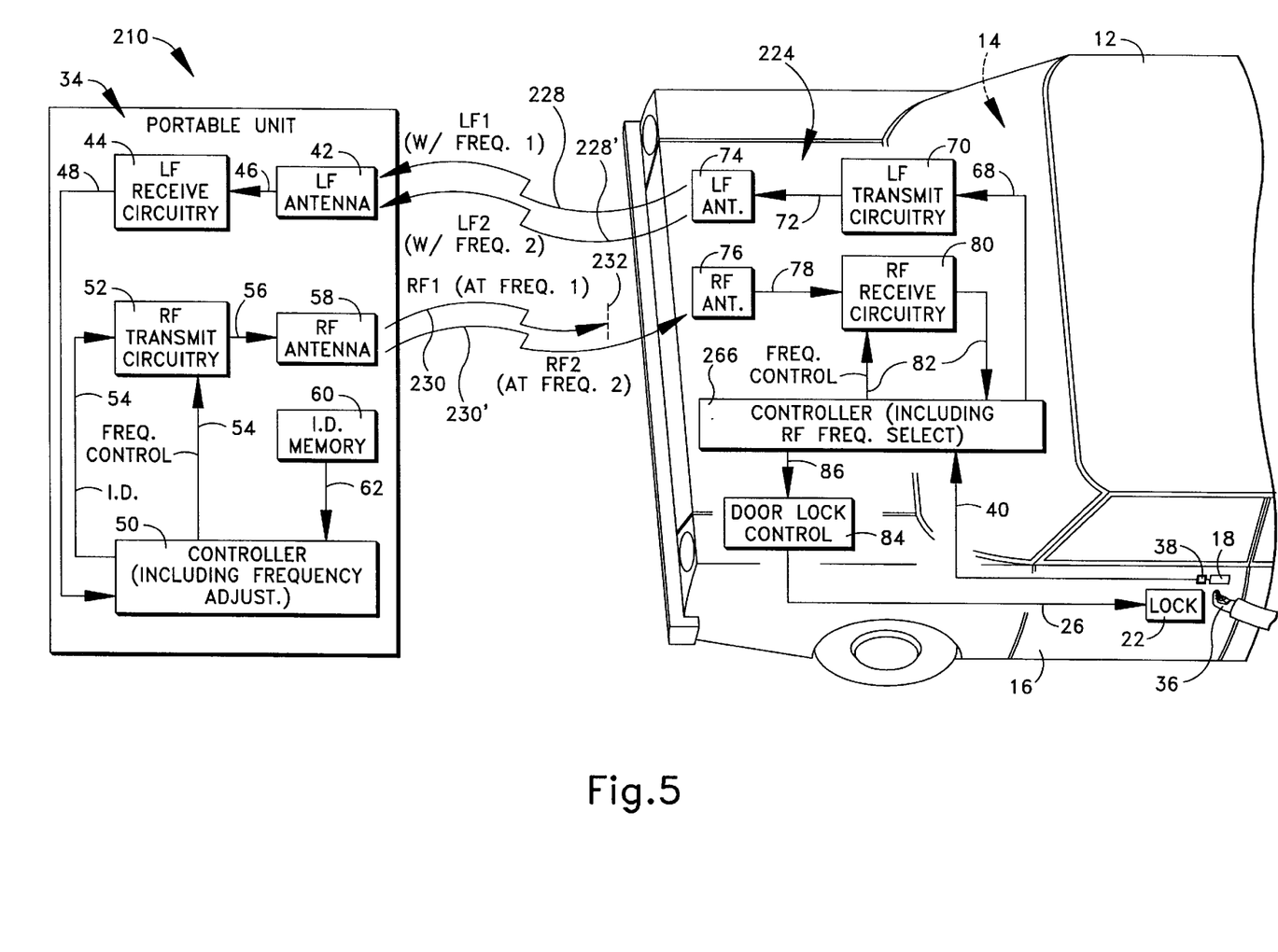
FIG. 5 is a block diagram of a second embodiment of a system in accordance with the present invention, and an associated vehicle.

A specific example of this aspect of the present invention is shown in the embodiment of a passive entry system 210 of FIG. 5. The passive entry system 210 includes a portable transceiver 34 that is identical to the portable transceiver 34 shown in the embodiment of FIG. 1. Accordingly, the structural elements of the portable transceiver 34 (FIG. 5) for the second embodiment are not discussed in detail and the same reference numerals are used for the portable transceiver shown in FIG. 5.

Turning to a vehicle-based unit 224 of the system 210, the vehicle-based unit has several components that are identical to corresponding components within the first embodiment of FIG. 1. The same reference numerals are used in FIG. 5 for the components that are the same as in the embodiment of FIG. 1. Specifically, as shown in FIG. 5, the door handle sensor 38 provides a signal indicative of the hand 36 reaching to actuate the door handle 18. Also, the door lock control 84 provides the signal to the door lock mechanism 22. The LF antenna 74 is operatively connected 72 to LF transmit circuitry 70 for outputting LF signals 228, 228' that convey RF frequency information as data. Also, the RF antenna 76 is operatively connected 78 to RF receive circuitry 80. The RF receive circuitry 80 is tunable to receive RF response signals 230, 230' at each of the predetermined frequencies.

The difference between the embodiment shown in FIG. 5 and the embodiment shown in FIG. 1 is that a controller 266 of the embodiment of FIG. 5 merely selects a RF frequency channel from a predetermined group of frequency channels. The current selected RF frequency is provided to the portable transceiver 34 for the portable transceiver to attempt and reach the vehicle-based unit 224 using the current selected RF frequency. Thus, the controller 266 does not include a portion that monitors noise on the predetermined frequency channels and does not include a portion that makes a determination as to a suitable or best frequency.

As is shown in FIG. 5, the first LF signal 228 is output from the vehicle-based unit 224 and conveys a first selected RF frequency as data. The portable transceiver 34 receives the first LF signal 228, and in response thereto, outputs the first RF response signal 230 that conveys the security code identification at the first selected RF frequency. In the illustrated example, the first RF response signal 230 is not received at the vehicle-based unit 224 due to some external influence 232, such as interference noise.

The lack of reception of the first RF response signal 230 causes the vehicle-based unit 224 to output the second LF signal 228' that coveys a second selected RF frequency as data. In one respect, the vehicle-based unit 224 presumes that the first selected frequency channel has an excessive noise level or the like because a response was not received.

At the portable transceiver 34, the second LF signal 228' causes the output of the second RF response signal 230' that conveys the security code identification at the second selected frequency. In the illustrated example, the second RF response signal 230' is received at the vehicle-based unit 224. It to be appreciated that several RF frequencies can be provided via LF signals and used to output RF response signals before a response signal reaches the vehicle-based unit 224.

Figure 6:
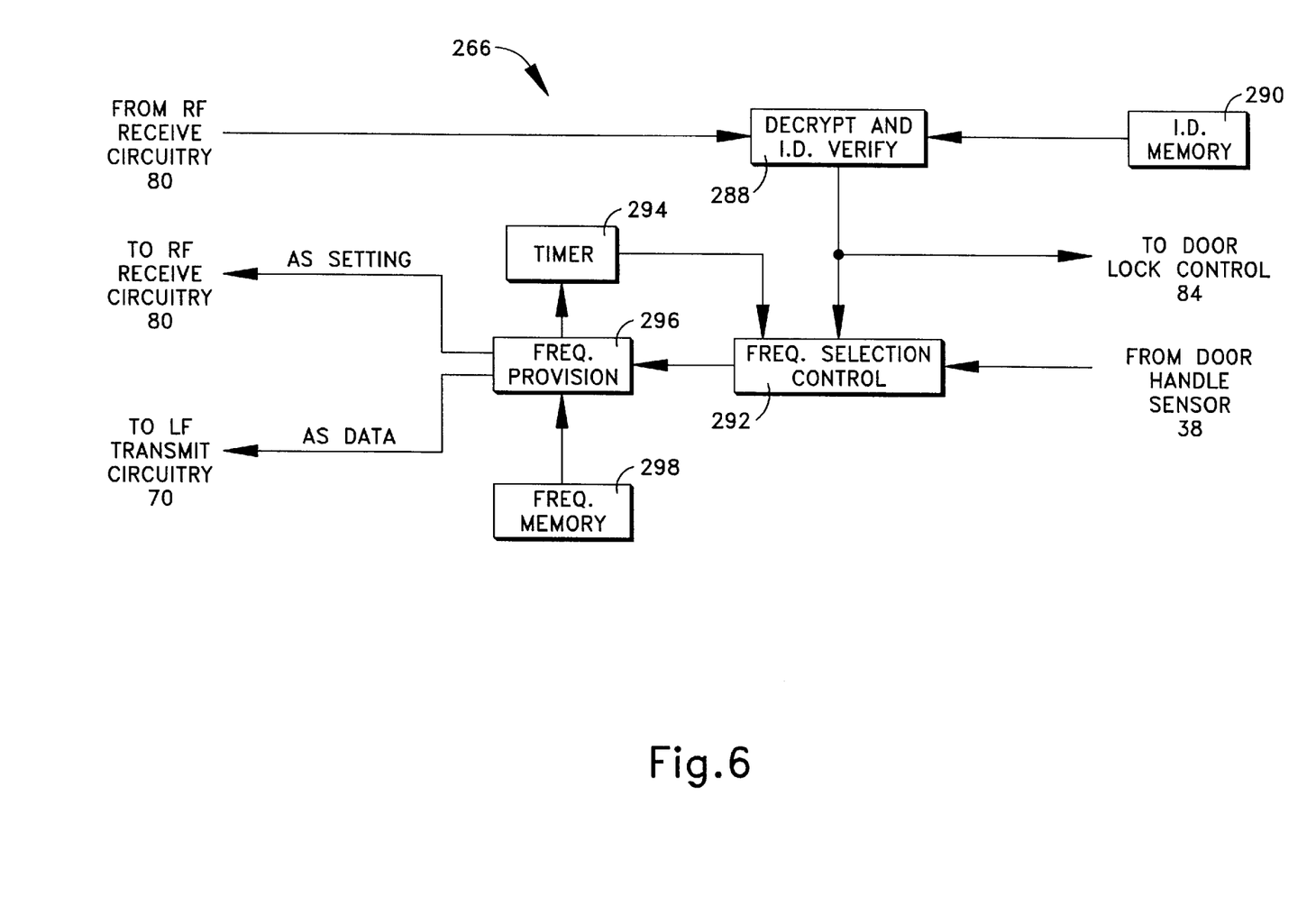
FIG. 6 is a function block diagram of a controller at the vehicle shown in FIG. 5.

Turning attention to FIG. 6, details of the controller 266 of the vehicle-based unit 224 of the embodiment of FIG. 5 are shown. Similar to the controller 66 shown in FIG. 2, the controller 266 of FIG. 6 includes a decrypt/identification verification function portion 288 that is operatively connected to the RF receive circuitry 80 and a security code identification memory 290 for comparing security codes. The decrypt/identification verification function portion 288 is operatively connected to the door lock control 84 to provide an unlock command upon verification of a received security code.

A frequency selection control function portion 292 is operatively connected to receive input from the door handle sensor 38 and is also operatively connected to a frequency provision function portion 296. Predetermined RF frequency values are selected from a frequency memory 298 by the frequency provision function portion 296. Each RF frequency is provided as a setting to the RF receive circuitry 80 and as data to the LF transmit circuitry 70.

A subsequent frequency is selected if a previous selected frequency does not result in receipt by the vehicle-based unit 224 of a RF response signal at the previously selected frequency. In one example, the frequencies are sequentially selected. It is to be appreciated that frequency selection may be based upon any selection pattern, for example the pattern may include selecting a frequency that was last successfully used as a first selection.

The output of the decrypt/identification verification function portion 288 is provided to the frequency selection control function portion 292 such that the frequency selection control function portion is notified that the vehicle-based unit 224 has received the RF response signal at the previously selected frequency. The frequency selection control function portion 292 instructs the frequency provision function portion 296 to abstain from providing another frequency once the RF response signal is received.

A timer function portion 294 is operatively connected to the frequency provision function portion 296 and the frequency selection control function portion 292. A timed period is initiated at the timer function portion 294 upon each provision of a frequency to the RF receive circuitry 80 and the LF transmit circuitry 70 by the frequency provision function portion 296. A signal is provided to the frequency selection control function portion 292 upon expiration of each time period. Each time period provides a length of time within which it can be expected that the portable transceiver 34 will respond with a RF response signal at the selected frequency. Thus, the frequency selection control function portion 292 provides an indication to the frequency provision function portion 296 to advance to a next frequency based upon expiration of the timed period so that the vehicle-based unit 224 proceeds to sequentially output LF signals that convey the selected RF frequencies.

Figure 7:
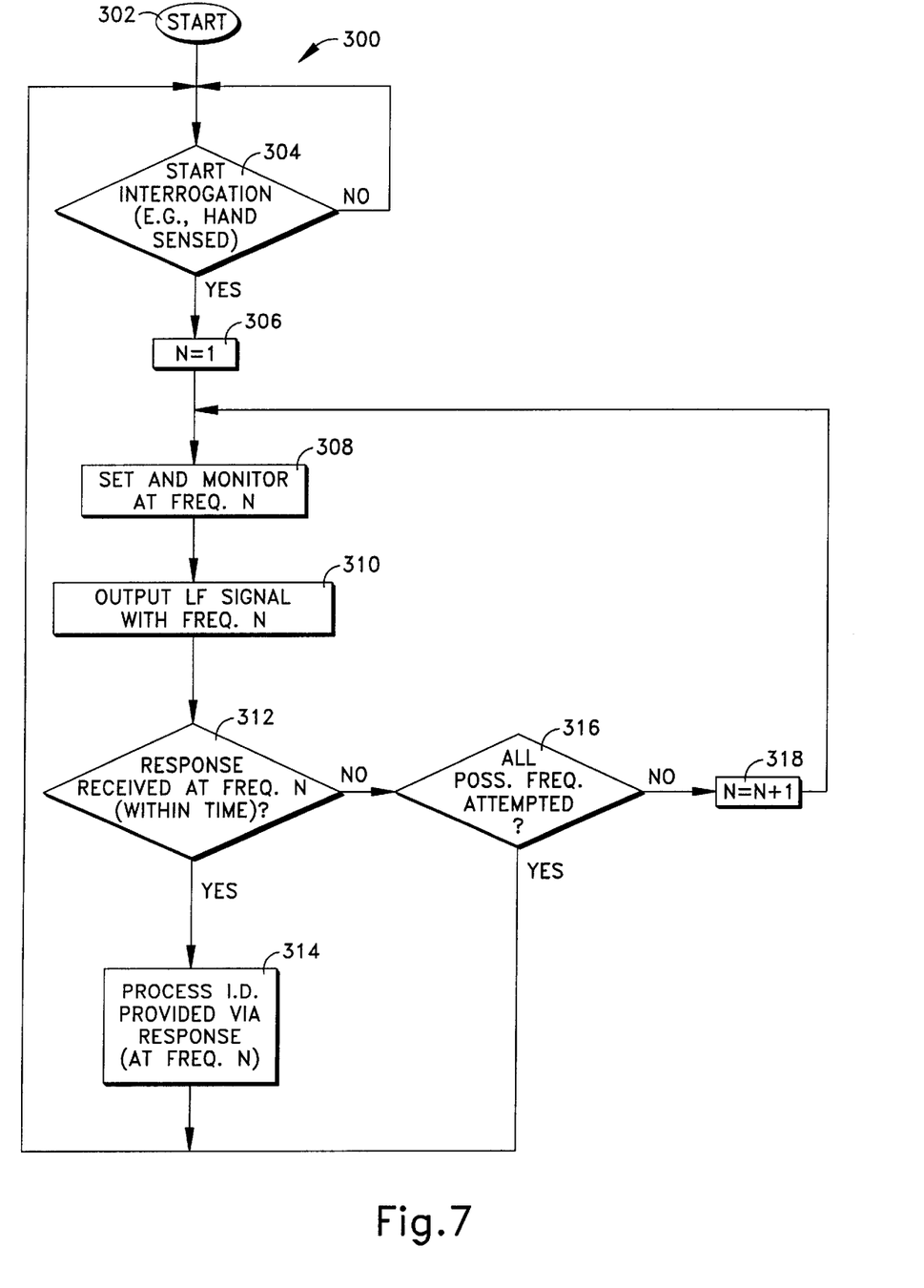
FIG. 7 is a flow chart for a processed performed within the controller at the vehicle shown within FIG. 5.

FIG. 7 illustrates a process 300 that is performed within the controller 266 shown in FIG. 6. The process 300 is initiated at step 302 and proceeds to step 304. At step 304, it is determined whether the interrogation process is to be initiated. Specifically, it is determined whether the signal from the door handle sensor 38 indicates that the hand 36 is reaching to actuate the door handle 18. If the determination at step 304 is negative (i.e., no indication of the hand 36 reaching for the handle 18), the process 300 loops to repeat the query of step 304.

If the determination at step 304 is affirmative (i.e., the hand 36 is reaching to the door handle 18), the process 300 proceeds to step 306. At step 306, a variable N is set equal to 1. The variable N is an identifier utilized to identify the predetermined frequency channels.

At step 308, the RF receive circuitry 80 is set to monitor at the RF frequency N. At step 310, the LF signal is output to convey the data regarding the selected RF frequency N. At step 312, it is determined whether a RF response signal is received at the frequency N. The response period is the period before expiration of the time period provided by the timer function portion 294.

If the determination at step 312 is affirmative (i.e., the RE response signal is received), the process 300 proceeds to step 314. At step 314, a security code identification that is provided via the response RF signal is processed and the appropriate action (i.e., unlocking of the door 16) is performed. Upon completion of step 314, the process loops back to step 304.

If a RF response signal is not received, the determination at step 312 is negative. Upon a negative determination at step 312, the process 300 proceeds to step 316. At step 316, it is determined whether all of the predetermined frequency channels for the RF frequency have been attempted. If the determination at step 316 is negative (i.e., all of the potential frequency channels have not yet been attempted), the process 300 proceeds to step 318. At step 318, the variable N is increased by 1. Increasing the variable N by 1 causes the next predetermined frequency to be selected and utilized for the interrogation sequence. Upon completion of step 318, the process 300 proceeds to step 308.

If the determination at step 316 is affirmative (i.e., all of the predetermined frequency channels have been attempted), the process 300 proceeds from step 316 to step 304. An affirmative determination at step 316 occurs when the vehicle-based unit 224 has not received any RF response signal despite the fact that all of the predetermined frequency channels have been attempted.

As a further aspect of the present invention, the LF signals output from a vehicle-based unit may be output a different LF frequencies. The adjustment/selection of the LF frequencies may be in a manner similar to the adjustment/selection of the RF response signals described for the other embodiments of the present invention. An example of a passive entry system 410 incorporating the adjustment/selection of the LF frequency signals is shown in FIG. 8.

Figure 8:
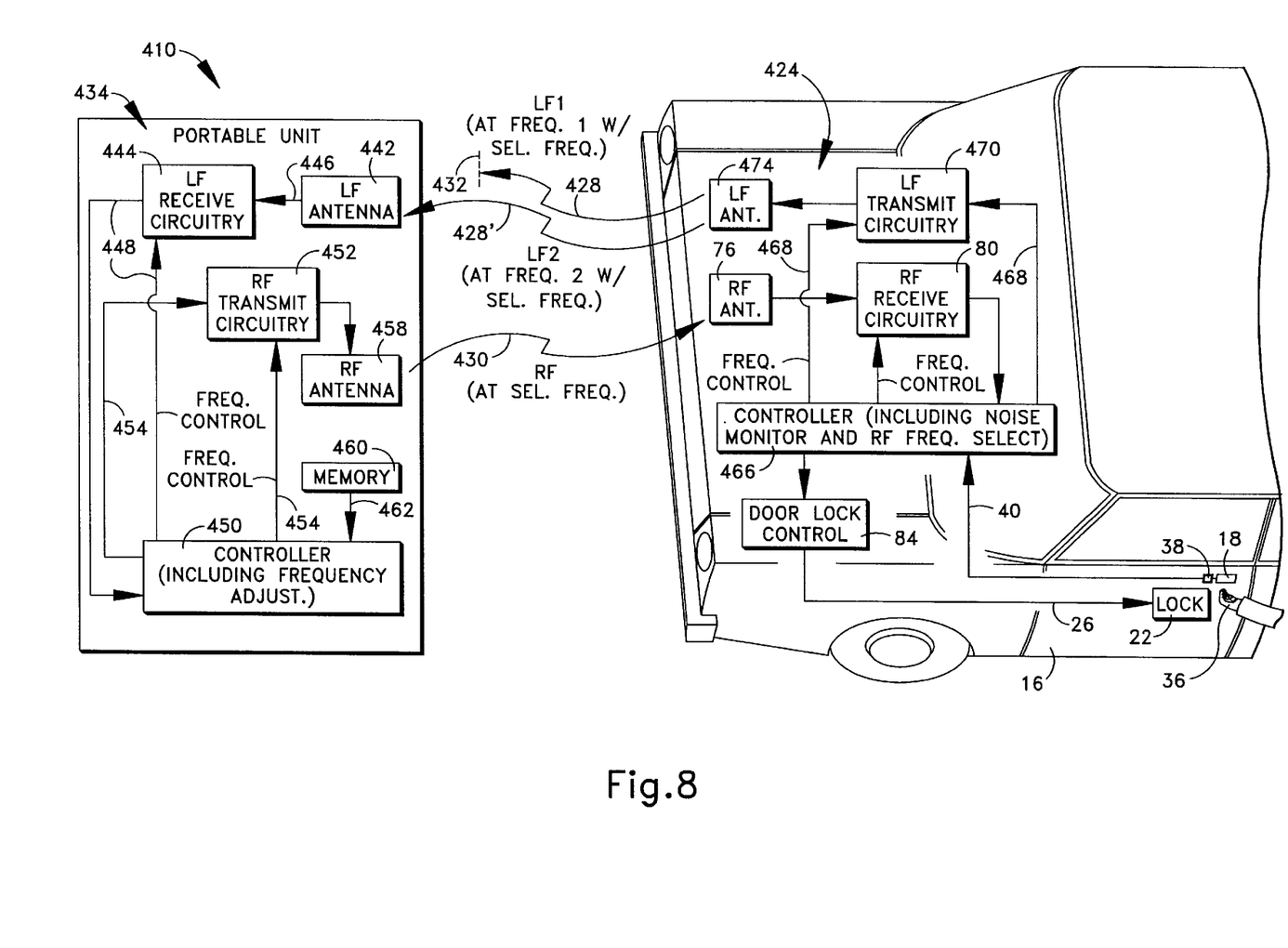
FIG. 8 is a block diagram of a third embodiment of a system in accordance with the present invention, and an associated vehicle.

The system 410 of FIG. 8 has a portable transceiver 434 that includes RF transmit circuitry 452 and a RF antenna 458 that are utilized to output a RF response signal 430 at a selected frequency. A controller 450 is operatively connected 454 to the RF transmit circuitry 452 to cause transmission at the selected RF frequency.

The portable transceiver 434 also includes a LF antenna 442 operatively connected 446 to LF receive circuitry 444 that is in turn operatively connected 448 to the controller 450. The portable transceiver 434 is capable of receiving LF signals on at least two different frequencies. Accordingly, the LF receive circuitry 444 is adjustable. Adjustment of the LF receive circuitry 444 is shown to be provided by a control signal provided from the controller 450. However, it is to be appreciated that the LF receive circuitry 444 may provide for its own adjustment (i.e., a toggling setting), or may be configured to simultaneously receive a plurality of LF frequencies.

The output of the LF receive circuitry 444 is provided to the controller 450. The message conveyed via a received LF signal is provided to the controller 450. In response to the receipt of the LF signal, the controller 450 accesses the security code identification from an operatively connected 462 identification memory 460 such that the security code is transmitted via the response signal a the selected RF frequency provided by the received LF signal.

At a vehicle-based unit 424 of the system 410, some of the components provided are the same as corresponding components provided for the previous embodiments. Specifically, the door handle sensor 38, the door lock control 84, the RF antenna 76, and the RF receive circuitry 80 are the same as the associated components described for the previous embodiments.

The vehicle-based unit 424 includes a LF antenna 474 and LF transmit circuitry 470 that is operatively connected 468 to a controller 466. The LF transmit circuitry 470 is adjustable for providing the output of the plurality of LF signals 428, 428' at the different LF frequencies. The controller 466 selects the LF frequency that is to be used for transmission of the LOW frequency signal and provides a frequency setting via a frequency control signal to the LF transmit circuitry 470. It is contemplated that the controller 466 of the embodiment shown with FIG. 8 may select among predetermined LF frequencies based upon some determination or may merely sequence (e.g., toggle) through the predetermined LF frequencies.

In addition to the LF frequency selection and associated control of the LF transmit circuitry 470, the controller 466 operates similar to the controllers described for the previous embodiments with regard to RF signal selection and identification verification. For example, the RF frequency selection process may include trial of various radio frequencies and/or monitoring for noise on the predefined frequencies. The operation of the controller 466 thus includes provision of the selected frequency to the RF received circuitry 80 as a setting and provision of the RF frequency as data to the LF transmit circuitry 470 for conveyance to the portable transceiver 434.

Typically, LF frequencies are relatively impervious to disruption caused by an external influence 432, such as noise. However, the ability to change the LF frequency as set forth in embodiment of FIG. 8 would permit the system 410 to proceed with an interrogation sequence if the first LF signal 428 at a first frequency was blocked from reaching the portable transceiver 434 by some external influence 432. The second LF signal 428' at the second LF frequency would then be provided for reception by the portable transceiver 434.

The second LF signal 428' may convey the same selected RF frequency as the first LF signal 428 or may convey another RF frequency. The reception of the second LF signal 428' results in the output of the RF response signal 430 at the selected frequency provided via the second LF signal 428'.

From the above description of the invention, those skilled in the art will perceive improvements, changes and modifications. For example, the system may be used for passive entry at an entrance to some other structure, such a building, and the passive entrance function may include movement of the entranceway cover for the authorized person.

Also, various other functions may be passively controlled. For example, in the environment of a vehicle, the system may be used to passively enable engine ignition or to passively actuate the engine ignition for the authorized person. Such ignition functions (i.e., enabling and actuating) are passive functions that may be accomplished via the system in accordance with the present invention. Such use of the system may utilize some or all of the disclosed features of the illustrated examples (e.g., non-continuous operation and an associated trigger to initiate interrogation operation). Also, the disclosed features may be modified accordingly to fit appropriate circumstances (e.g., use occupancy detection to trigger interrogation for a system that passively controls a vehicle ignition function).

Such improvements, changes and modifications within the skill of the art are intended to be covered by the appended claims.

Having described the invention, the following is claimed:

1. A method for gaining access through a securable entrance, said method comprising:

selecting, at a receiving location, a frequency at which an access request signal is to be output from a requesting location;

providing the selected frequency to the requesting location from the receiving location;

outputting the access request signal at the selected frequency from the requesting location; and receiving the access request signal at the receiving location and permitting access through the entrance in response to receipt of the access request signal.

2. A system for remotely controlling a function, said system comprising:

means for outputting an interrogation signal that designates one response signal frequency from a plurality of different response signal frequencies;

means for receiving the interrogation signal;

means for outputting a response signal that includes a function request portion, said means for outputting a response signal including tunable means for enabling the response signal to be output at any one of the plurality of different response signal frequencies, said tunable means being responsive to the designated response signal frequency of the interrogation signal for causing said means for outputting a response signal to output the response signal at the designated response signal frequency; and means for receiving the response signal at the designated response signal frequency and for performing the function requested by the function request portion of the response signal.

3. A system as set forth in claim 2, wherein said means for outputting a response signal includes means for outputting the response signal as a radio frequency signal.

4. A system as set forth in claim 2, further including means for determining noise present at each of the plurality of different response signal frequencies and means for selecting the designated response signal frequency based on the noise present.

5. A system as set forth in claim 4, wherein said means for determining noise present at each of the plurality of different response signal frequencies further includes means for determining whether the noise present exceeds a predetermined level.

6. A system as set forth in claim 4 wherein said means for determining noise present at each of the plurality of different response signal frequencies further includes means for determining which of the plurality of different response signal frequencies has a lowest noise level.

7. A system as set forth in claim 2 further including means for sequentially designating different response signal frequencies from the plurality of different response signal frequencies and means for causing said means for outputting an interrogation signal to sequentially output an interrogation signal for each different response signal frequency designated.

8. A system as set forth in claim 2 wherein said means for receiving the response signal further includes means for receiving signals at any one of the plurality of different response signal frequencies and means for tuning said means for receiving the response signal to receive the response signal at the designated response signal frequency.

9. A system as set forth in claim 2 wherein said means for outputting an interrogation signal includes means for outputting a low frequency signal and wherein said means for outputting a response signal includes means for outputting a radio frequency signal.

10. A system as set forth in claim 2 wherein said system remotely controls access through a securable entrance, said means for receiving the response signal and performing the function requested further includes means for permitting access through the securable entrance in response to receipt of the function request portion of the response signal.

11. A system for remotely controlling a function, said system comprising:

means for sequentially outputting a plurality of interrogation signals, each interrogation signal of the plurality of output interrogation signals indicating a designated request signal frequency, the designated request signal frequency for each of the output interrogation signals being different;

means for receiving the interrogation signals and for outputting function request signals, said means for outputting function request signals being responsive to the designated request signal frequency received in each interrogation signal for outputting an associated function request signal at the designated request signal frequency;

means adapted for receiving the function request signals; and means for performing the function in response to receipt of an associated function request signal.

12. A system as set forth in claim 11 wherein said means for outputting function request signals includes means for outputting the function request signals as radio frequency signals.

13. A system as set forth in claim 11 further including means for determining noise present on each of the different designated request signal frequencies.

14. A system as set forth in claim 13 wherein said means for determining noise present on each of the different designated request signal frequencies includes means for determining whether the noise present is below a predetermined level.

15. A system as set forth in claim 13 wherein said means for determining noise present on each of the different designated request signal frequencies includes means for determining which one of the different designated request signal frequencies has a lowest noise level.

16. A system as set forth in claim 11 wherein said means for outputting function request signals includes tunable means for enabling each function request signal to be output at the designated request signal frequency associated with the received interrogation signal.

17. A system as set forth in claim 11 wherein said means adapted for receiving the function request signals further includes means for tuning said means adapted for receiving to receive each function request signal at its designated request signal frequency.

18. A system as set forth in claim 11 wherein said means for sequentially outputting a plurality of interrogation signals includes means for outputting low frequency signals and wherein said means for outputting function request signals includes means for outputting radio frequency signals.

19. A system as set forth in claim 11 wherein said system remotely controls access through a securable entrance as the function, means for performing the function in response to receipt of an associated function request signal includes means for permitting access through the securable entrance.

20. A method for remotely controlling a function, said method comprising the steps of:

sequentially outputting a plurality of interrogation signals, each interrogation signal of the plurality of output interrogation signals indicating an associated designated request signal frequency, the associated designated request signal frequency for each of the output interrogation signals being different;

receiving the interrogation signals;

outputting a function request signals at the associated designated request signal frequency for each received interrogation signal;

receiving the function request signals; and performing the function in response to receipt of one of the function request signals.

21. The method of claim 20 wherein the step of performing the function in response to receipt of one of the function request signals includes the step of permitting access through a securable entrance.

* * * * *